United States Patent [19]

Freudelsperger

[11] Patent Number: 5,253,783

[45] Date of Patent: Oct. 19, 1993

[54] APPARATUS FOR STORING AND AUTOMATICALLY SORTING ITEMS

[75] Inventor: Karl Freudelsperger, Hausmannstatten, Austria

[73] Assignee: Knapp Logistik Automation G.m.b.H., Austria

[21] Appl. No.: 945,940

[22] Filed: Sep. 17, 1992

[30] Foreign Application Priority Data

Sep. 17, 1991 [DE] Fed. Rep. of Germany ... 9111566[U]

[51] Int. Cl.$^5$ .............................................. B65G 59/00
[52] U.S. Cl. ..................... 221/131; 221/282; 221/197; 221/133; 198/536
[58] Field of Search ............... 414/276; 198/535, 536; 221/124, 131, 133, 197, 92, 93, 94, 282

[56] References Cited

U.S. PATENT DOCUMENTS

| | | | |
|---|---|---|---|
| 2,374,537 | 4/1945 | Goldsmith | 234/1 |
| 2,599,907 | 6/1952 | Farmer | 198/42 |
| 2,925,195 | 2/1960 | Faulkner | 221/92 |
| 4,251,010 | 2/1981 | Schmeykal et al. | 221/93 |
| 5,096,090 | 3/1992 | Schwartz et al. | 221/131 |

FOREIGN PATENT DOCUMENTS

| | | |
|---|---|---|
| 3213119A1 | 10/1983 | Fed. Rep. of Germany . |
| 9003739 | 7/1990 | Fed. Rep. of Germany . |
| 1046641 | 10/1966 | United Kingdom . |

Primary Examiner—H. Grant Skaggs
Attorney, Agent, or Firm—Bacon & Thomas

[57] ABSTRACT

An apparatus for storing and automatically sorting items, in which the items are stored in bins or magazines arranged on bin-bases affixed to a frame from which individual bin-bases can be pulled out, includes a horizontal conveyor, each bin including an item dispenser through which items are dispensed onto the horizontal conveyor. The horizontal conveyor is positioned beneath the bin-bases and transversely to their end faces, and extends width-wise only across a central part of the apparatus. The apparatus further includes guide plates sloping down toward the conveyor in a part of the apparatus to which the conveyor does not extend for guiding items from the item dispensers to the conveyor. The frame includes an upper beam resting on a row of pillars mounted above the conveyor on A or inverted V-shaped supports whose legs rest on opposite lateral sides of the conveyor, one row of bin-bases being mounted on each side of the columns.

11 Claims, 3 Drawing Sheets

APPARATUS FOR STORING AND AUTOMATICALLY SORTING ITEMS

BACKGROUND OF THE INVENTION

1. Field of the Invention

The invention concerns an apparatus for storing and automatically sorting items, in which a plurality of bases for bins or magazines, hereinafter known as bin-bases, are arranged in at least one row and are affixed at an angle or slope to a framework from which they can be pulled out, the bin-bases supporting a plurality of item-specific bins or magazines each having at least one item-dispenser at a lower end for dispensing the items, such as box-packed drugs, cosmetics, or chemicals, onto at least one horizontal conveyor moving underneath the bin-bases and transversely to their end faces.

2. Description of Related Art

An automatic storing and sorting apparatus having pull out shelves is known from German Offenlegungsschrift 32 13 119 A1. This apparatus comprises a row of bin-bases which include bins or magazines for specific kinds of items. The bin-bases are sloping and may be pulled out along telescoping guides while remaining affixed to a bridge framework. Conveyor belts are present underneath the bin-bases, the width of the belts corresponding to that of the bin-bases. Accordingly, items dispensed from item-specific magazines drop directly on one of the conveyor belts. The bridge framework is parallel to the direction of advance and positioned centrally above the conveyor belts. The framework rests on two posts located beyond the apparatus base zone swept over by the conveyor belts.

The known apparatus has the drawback that it cannot be made to any desired length in a simple manner, because the length is restricted by the biggest free span of the bridge framework support. Nor does this apparatus allow meeting various length requirements in a modular manner. Because the conveyor belts extend broad-side across the entire apparatus, restrictive limits are set on the possible width of the bin-bases. As a result, for application to large sorting facilities, where thousands of different sorted items must be kept in the least space with minimal equipment, the known apparatus is inadequate.

SUMMARY OF THE INVENTION

It is therefore an objective of the present invention to further develop the apparatus of the state of the art so that it may be made substantially longer and also wider, and so that it can be matched in modular manner to various lengths, and made as compact and as simple as possible.

This problem is solved by providing an apparatus in which the horizontal conveyor extends width-wise only across a central part of the apparatus, and in which guide plates slanting toward the conveyor are present in the part which is not covered by the conveyor, the framework including an upper beam resting on a number of pillars mounted above the horizontal conveyor and in turn resting on both sides of the conveyor on two-leg supports, one row of bin-bases being present on each side of the row of pillars.

Preferably, the bin-bases include horizontal support rails affixed in pull-out manner to the upper beam. The support rails preferably are guided by rollers mounted to the upper beam. In one preferred embodiment, the upper beam projects outward above the row of bin-bases. In another preferred embodiment, the support rails laterally project beyond the bin-bases into the apparatus inside. Advantageously, mutually opposite bin-bases are height-offset.

Preferably, the support rails are mounted on support-rail braces extending upward from the bin-base, each bin-base including at least one item-stocking shaft mounted on the support-rail braces. The horizontal conveyor preferably is a roller conveyor and may include driven or idle rollers. In case the rollers are idle, the conveyor is slightly slanting and the two-leg supports are preferably A-shaped. Advantageously, the lower end face of each item magazine is designed to be a dispensing aperture, the dispenser including a retractable stop blocking at least partly the dispensing aperture.

As shown by the above discussion, the apparatus of the invention offers the advantage of modularity. By selecting the number of pillars, any desired length can be implemented in small steps, and great lengths also are feasible. By using guide plates it is possible to widen the bin-bases. Accordingly the innovative apparatus makes nearly optimal use of the space it occupies, while ensuring good accessibility, and its design is as simple as possible.

DETAILED DESCRIPTION OF THE PREFERRED EMBODIMENTS

Figure 1:
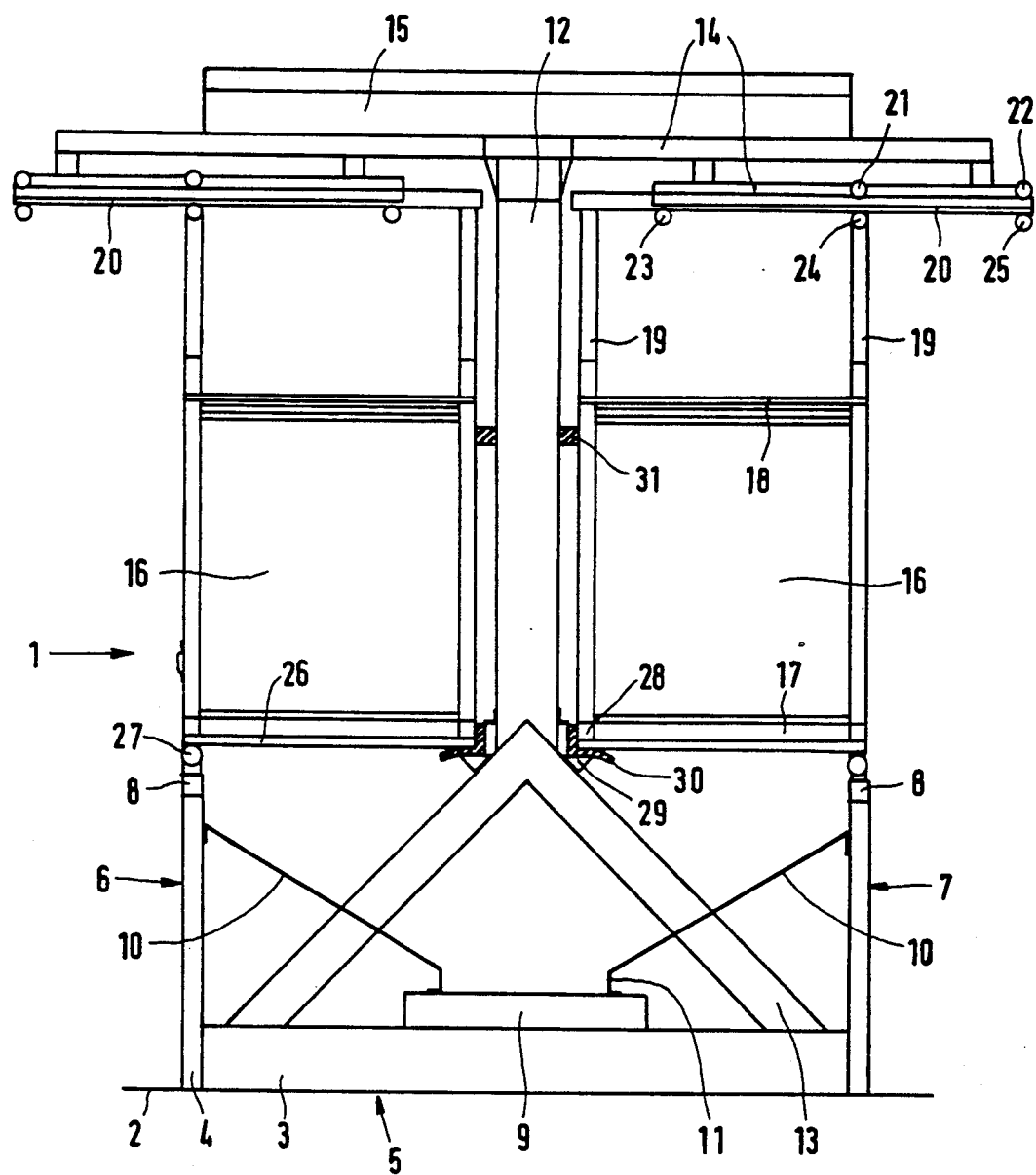
FIG. 1 is a cross-section of an illustrative embodiment of an apparatus with a laterally outward-projecting upper beam perpendicular to the longitudinal direction, that is, to the direction of advance of the horizontal conveyor.
Figure 2:
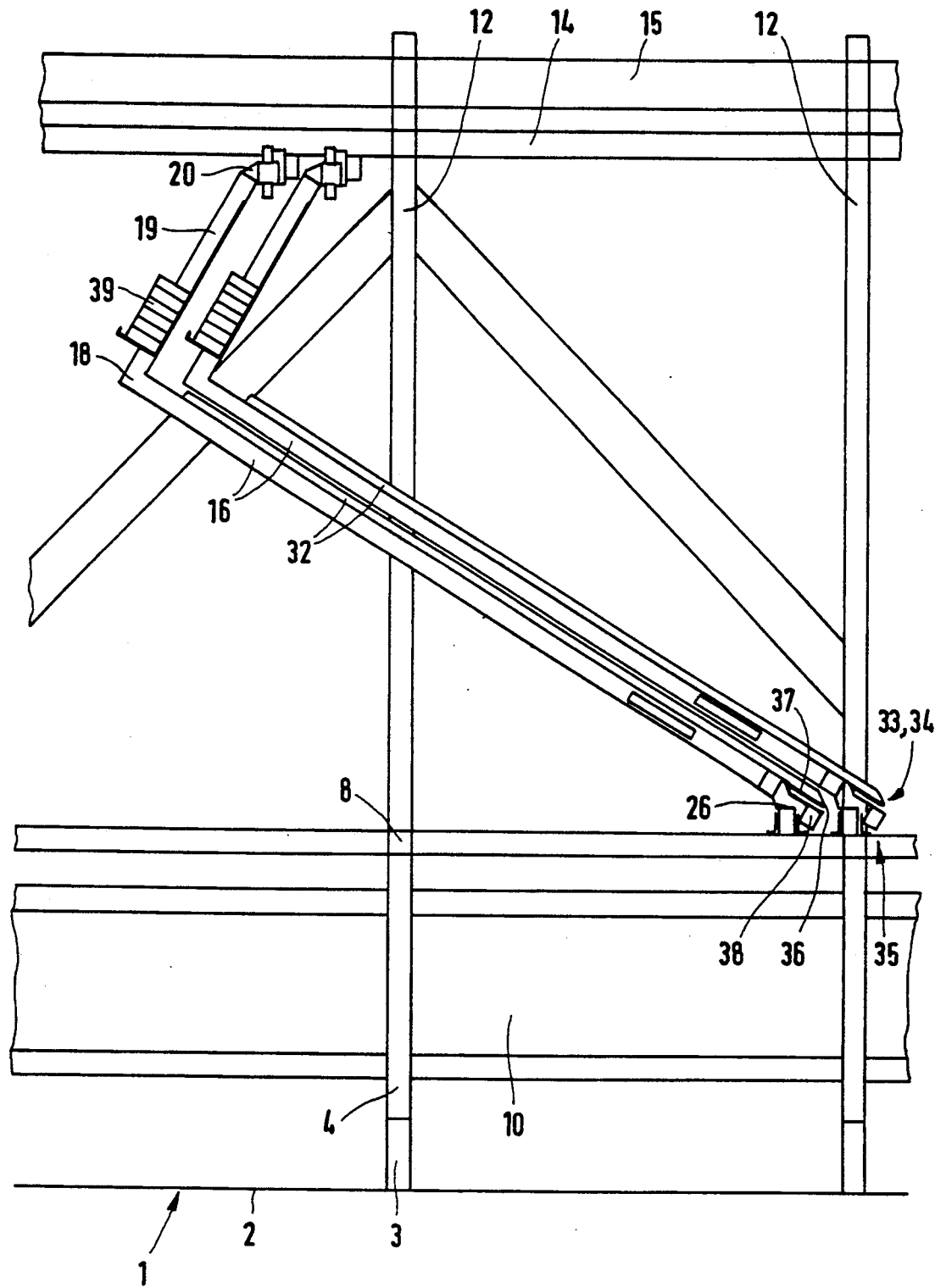
FIG. 2 is a side view of the apparatus shown in FIG. 1, only two bin-bases being shown.

An exemplary apparatus for storing and automatically sorting items is denoted by reference numeral 1 in FIGS. 1 and 2. This apparatus rests on the ground and is supported by a framework of respective horizontal and vertical bracing beams 3 and 4, collectively referred to as ground-reinforcing frame 5. The two vertical ground-frame beams 4 are always mounted in one row on the two exterior apparatus sides 6 and 7. They rise from the ground to a height of about one third of the total height of the apparatus 1. The vertical ground-frame beams 4 of one row are joined together by a longitudinal shaped-section 8.

A driven-roller conveyor 9 runs in the longitudinal direction centrally in ground-reinforcement frame 5. The width of the roller conveyor 9 is somewhat less than one-fourth of the total width of the apparatus 1. Those portions of the ground on either side of the roller conveyor 9, and not covered by the roller conveyor, are each covered by a guide plate 10. The guide plates 10 slope down toward the conveyor 9. Their external upper longitudinal sides are affixed to the vertical ground-frame beams 4 near the upper ends of the beams, and their lower, inside longitudinal sides are affixed to lateral guide plates 11 of the roller conveyor 9. The slope of the guide plates 10 relative to the horizontal is selected to be of such magnitude that the items falling on the guide plates 10 will reliably overcome frictional forces and slide under the joint action of gravity and friction onto the roller conveyor 9.

Pillars 12 mounted on two-leg supports 13 are arrayed longitudinally at fixed intervals and centrally along the roller conveyor 9. The two-leg supports 13 are A-shaped, though the A crossbeam is absent (thus, the shape may also be described as an inverted V). The pillars 12 and the two-leg supports 13 are connected together at the tip of the A approximately at the height of the longitudinal shaped-sections 8. The two-leg supports 13 span the roller conveyor 9 in the transverse direction. The legs of the A rest on both sides of the conveyor 9 on the horizontal ground-frame beams 3. Clearances are present in the guide plates 10 where the two-leg supports 13 pass through the guide plates 10.

The pillars 12 are connected at their upper ends by a horizontal upper beam 14. The upper beam 14 covers the entire apparatus 1 both longitudinally and transversely. Transversely, it projects on both sides beyond the exterior sides 6 and 7 of the apparatus 1. Together, the pillars 12 and the upper beam 14 form a T-shaped cross-section perpendicular to the longitudinal direction. A beam reinforcement member 15 is mounted on the upper beam 14 but does not project beyond exterior sides 6 and 7.

A row of bin-bases 16 arranged as a sloping stack are present on both sides of the row of pillars 12. A lower end face 17 and an upper end face 18 of the bin-bases 16 respectively run horizontally and parallel to the roller conveyor 9. The angle by which the bin-bases slope relative to the horizontal is 30°. Two support-rail braces 19 extend upward from the upper end face 18 at a right angle from the plane formed by the bin-bases 16. Braces 19 serve to keep a support rail 20 that runs parallel to the upper end face 18 at a predetermined distance above the bin-base 16.

An item stocking shaft 39 having a the stacking direction which is transverse to the bin-base 16 is mounted to the support-rail braces 19. Shaft 39 receives a surplus of items in addition to the stock present on the bin-base 16.

The bin-bases 16 can be pulled out completely and laterally, that is, transversely to the longitudinal direction. The support rail 20 is designed to be a cross-sectional double T for that purpose. Two upper support rollers 21 and 22 and three lower support rollers 23–25 engage each support rail 20. The rollers 21–25 are mounted to the upper beam 14, their axes being horizontal and in the longitudinal direction. The lower support denoted by 23 is located inside the apparatus 1 near the row of pillars 12, roller 24 is present on the exterior sides 6 and 7 and roller 25 is positioned on the outside of upper beam 14. The upper support roller 21 is plumb above the lower roller 24, and the upper roller 22 plumb above the lower roller 25. The upper longitudinal beam 14 projects by a distance somewhat larger than half the width of a bin-base 16. As a result, the bin-base 16 may be completely pulled out while remaining suspended and be safe from tipping over.

The upper groove of the support rail 20 is fitted with a stop at its inside end which comes to rest when the bin-base is being pulled out against the inside roller 21 and thus limits the pullout distance. The support rail 20 projects outward above the bin-base 16 by a distance corresponding to the projection of the upper beam 14 beyond the external lateral sides 6 and 7. A horizontal rest rail 26 is provided at the lower end face 17 of a bin-base 16 and rests on a support roller 27 mounted on the top of the longitudinal-shaped section 8. A minimum of a three-point support is ensured for every pullout position of the bin-base 16 by the arrangement of the rollers 21–25 and 27 and the outward projection of the support rail 20.

When in its retracted position, a lower corner 28 of bin-base 16 rests against an angled stop 29. The stop 29 includes an elastic layer and can absorb vertical and lateral pressures. The horizontal leg 30 of the stop 29 is outwardly and downwardly bevelled to ensure that the corner 28 will properly ride onto it when the bin-base 16 is being retracted. Also, an elastic stop 31 is provided above the stop 29.

Several parallel spacer strips 32 (only shown in FIG. 2) running from top to bottom are present on the topside of the bin-base 16. Every two adjacent spacer strips 32, together with the part of the bin-base 16 they enclose, form an item-specific bin or magazine (or compartment) open at the top, and as a rule one spacer strip 32 forms a partition for two adjacent item-specific bins or magazines. The spacer strips 32 are mounted in laterally displaceable manner on the bin-base, and as a result the item-specific bins or magazines can be matched to various item packing sizes.

The lower end face 33 of an item-specific bin or magazine serves as the dispensing aperture 34. An automated dispenser 35 is mounted on the dispensing aperture 34. The dispenser 35 consists of a stop strip 36 affixed at a right angle to the free end of a unilaterally clamped elastic tab 37. The free end of the elastic tab 37 is connected to the armature of an electromagnet 38. The stop strip 36 when in its rest position enters the item-specific bin or magazine and thereby partly blocks the dispensing aperture 34. When the electromagnet 38 is energized, the elastic tab 37 is pulled down enough for the stop strip 36 to clear the dispensing aperture 34. The electromagnet 38 is flat enough to project only slightly downward from the bin-base. The electromagnet 38 is mounted directly underneath the dispensing aperture 34 at a location free of any other bin-bases 16 underneath it. The flat design of the electromagnets 38 in combination with the discussed arrangement allows exceedingly tight packing of the bin-bases and hence optimal space utilization.

An ejection monitoring system (not shown) using a light barrier for each bin-base 16 may be provided, the light beam being transverse to all dispensing apertures 34 of the item-specific magazines of the bin-base 16. Also, a computer (not shown) may be connected to the electromagnets 38 of the dispensers 35, to the drive for the roller conveyor 9, and to the signal outputs of the light barriers, in order to control and monitor item assortment.

Figure 3:
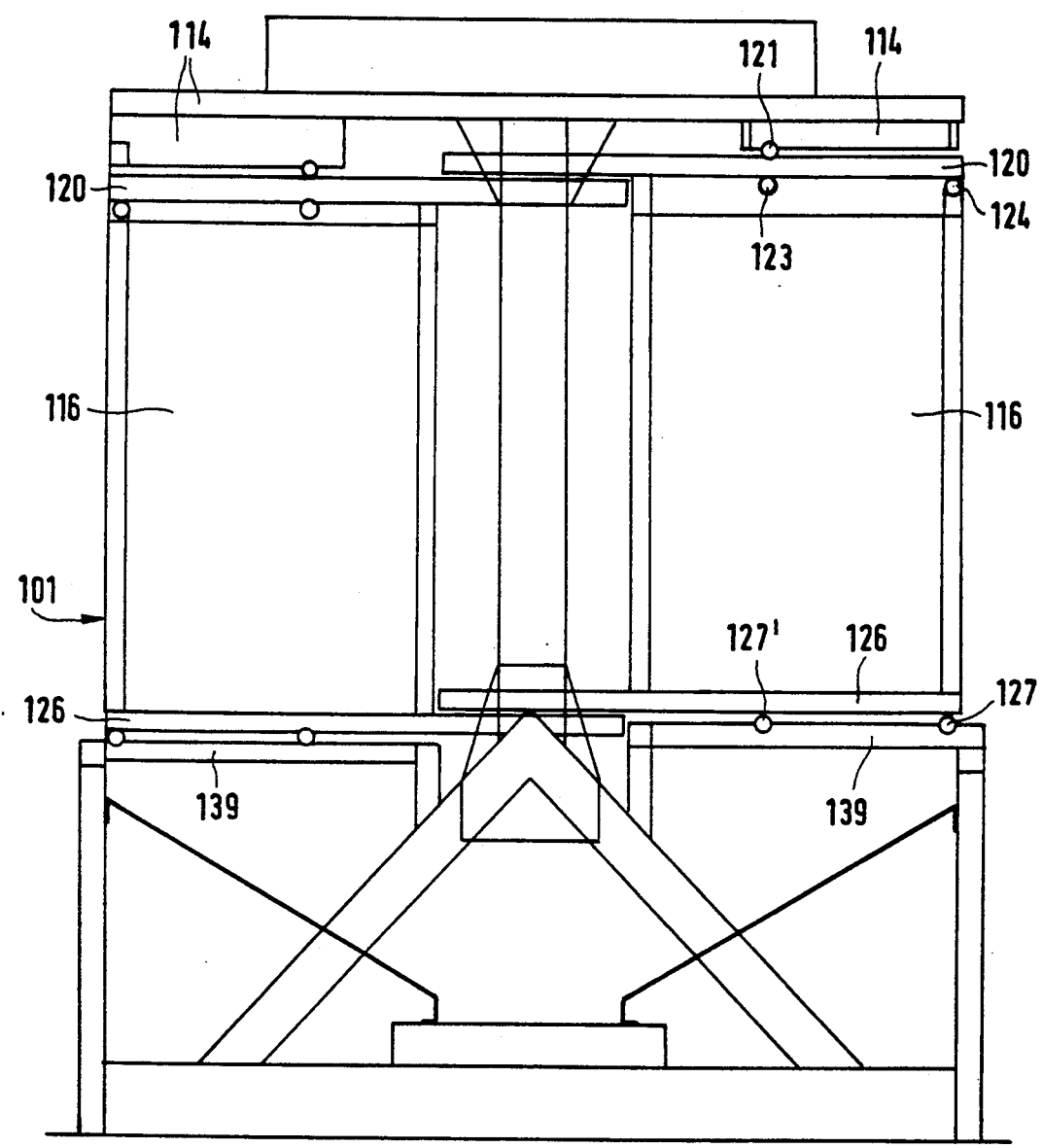
FIG. 3 is a cross-section of apparatus corresponding to FIG. 1 but for another embodiment mode with support rails projecting laterally beyond the bin-bases into the apparatus inside.

Another illustrative embodiment of the innovation with support arms projecting from the bin-bases to the inside is described in relation to FIG. 3. This embodiment is identical as regards most features already described in relation to FIGS. 1 and 2. Therefore, only those features that differ will be described in the following description.

In this embodiment, the upper longitudinal beam 114 does not project laterally beyond the exterior sides 6 and 7, and the support rail 120 does not project outward but instead projects inward above the bin-base 116. The projection is somewhat larger than half the width of the bin-base 116. The support rail 120 is guided by two lower support rollers 123 and 124 and one upper support roller 121. Support roller 124 is located on the exterior sides 6 and 7, and support roller 123 is offset inward by a distance corresponding approximately to the projection of the support rail 120. The upper support roller 121 is plumb above the lower support roller 123.

The rest rail 126 at the lower end face 17 of the bin-base 116 also projects inward above the bin-base 116 by a distance which corresponds to the projection of the support rail 120. The rest rail 126 rests on two support rollers 127 and 127' which are in turn affixed to a transverse-shaped section 139. The transverse-shaped section 139 is horizontal and at the height of the longitudinal-shaped section 8. The support roller 127 is plumb underneath the lower support roller 124 and the support roller 127' is plumb underneath the support rollers 121 and 123. The pullout distance of the bin-base is limited by a stop on the inside end of the support rail 120 coming to rest against the rollers 121, 123. The rollers 121, 123, 124, 127, 127' are higher on one side of the apparatus than on the other side, the height differential somewhat exceeding the height of the upper beam 114 or of the rest rail 126. As a result, mutually opposite bin-bases 116 are offset in height. This height-offset arrangement makes it possible to superpose the projections of the upper beams 114 and of the rest rails 126 in the retracted position of the bin-bases 116. Stop 29 and Stops 31 are therefore not necessary in this embodiment.

For automated sorting, the two embodiments function as follows: The electromagnet 38 of a selected item-specific magazine which contains the desired item is energized by the computer, thereby causing the elastic tab 37 to be pulled down until the stop strip 36 is retracted flush with the level of the bin-base 16 or 116. The lowermost item thereupon slips by gravity out of the magazine, breaks the light beam of the light barrier and drops onto one of the guide plates 10. The electromagnet 38 is energized so briefly that only one item at a time is dispensed from the magazine. The remaining items in the magazine slide forward but are kept inside by the stop strip 36 which is already back in its rest position. Several items can be dispensed from different bin-bases 16, 116 in parallel at the same time, but only in series within one bin-base 16, 116 and then with such a minimum time interval between them that the light beam can be re-established during the interval between dispensings. As a result it is feasible to monitor ejection with only one light barrier per bin-base 16, 116. The dispensed items slip down on the guide plates 10, drop onto roller conveyor 9 and are moved on to a collecting or dispensing station (not shown). Once all items of one assortment order have been dispensed, the assortment process is briefly interrupted to ensure separation in time between items belonging to different orders.

As regards replenishment, the bin-bases 16, 116 are pulled out laterally as far as the stop and a stack of items is placed obliquely from above into the open item-specific magazine. Replenishing can take place without interrupting operation. For that purpose, a movable guide-plate extension is temporarily mounted underneath the pulled-out bin-base 16, 116. When dispensing in the pulled-out state, the dispensed item drops first on the guide-plate extension and then slides onto the guide plate 10.

The apparatus framework is preferably made of aluminum shaped-sections and is supplied in single parts. Assembly takes place on site by screwing the shaped-sections together.

Finally, because variations of the preferred embodiment are possible within the scope of the invention, it is intended that the invention not be limited to the above description or by drawings. Instead, the invention should be defined solely in accordance with the appended claims.

I claim:

1. Apparatus for the storage and automated sorting of items, comprising a plurality of bin-bases mounted in sloping manner in at least one row and affixed to a frame from which they can be pulled out, and item-specific bins on the bin-bases, each bin having one dispenser at a lower end, and at least one horizontal conveyor positioned beneath the bin-bases and transversely to their end faces, wherein the horizontal conveyor extends width-wise only across a central part of the apparatus, and wherein the apparatus further comprises guide plates sloping downward toward the horizontal conveyor in a part of the apparatus to which the conveyor does not extend, the frame comprising an upper beam resting on a row of pillars mounted above the horizontal conveyor and supported on lateral sides of said conveyor by supports having two legs, each leg being located on one side of the conveyor, and wherein one row of bin-bases is mounted on each side of the rows of pillars.

2. Apparatus as claimed in claim 1, wherein the bin-bases comprise horizontal support rails which are affixed to the upper beam and which can be pulled out.

3. Apparatus as claimed in claim 2, wherein the rails are guided by rollers mounted on the upper beam.

4. Apparatus as claimed in claim 2, wherein the upper beam projects laterally above the at least one row of bin-bases.

5. Apparatus as claimed in claim 2, wherein the support rails projects laterally beyond the bin-base into the inside of the apparatus.

6. Apparatus as claimed in claim 5, wherein mutually opposite bin-bases are mounted in a height-offset manner.

7. Apparatus as claimed in claim 2, wherein the support rail is mounted on support-rail braces extending upwardly from the bin-bases.

8. Apparatus as claimed in claim 7, wherein the bin-bases include at least one item stocking shaft mounted to the support-rail braces.

9. Apparatus as claimed in claim 1, wherein the horizontal conveyor is a roller conveyor.

10. Apparatus as claimed in claim 1, wherein the two-leg supports are A-shaped.

11. Apparatus as claimed in claim 1, wherein a lower end face of each item-specific bin includes a dispensing aperture and wherein the dispenser includes a retractable stop at least partly blocking the dispensing aperture.

* * * * *